US012640505B2

(12) United States Patent      (10) Patent No.:    US 12,640,505 B2

Mortimer      (45) **Date of Patent:      \*May 26, 2026**

(54) INTEGRATED ELECTRICAL, LIGHTING, AND CHARGING SYSTEMS

(71) Applicant: Gregory Kenneth Mortimer, Scottsdale, AZ (US)

(72) Inventor: Gregory Kenneth Mortimer, Scottsdale, AZ (US)

( \* ) Notice: Subject to any disclaimer, the term of this patent is extended or adjusted under 35 U.S.C. 154(b) by 375 days.

This patent is subject to a terminal disclaimer.

(21) Appl. No.: 18/519,509

(22) Filed: Nov. 27, 2023

(65) Prior Publication Data

US 2024/0097362 A1      Mar. 21, 2024

Related U.S. Application Data

(63) Continuation-in-part of application No. 17/341,664, filed on Jun. 8, 2021, now Pat. No. 11,862,911.

(60) Provisional application No. 63/036,305, filed on Jun. 8, 2020.

(51) Int. Cl.

| | |
|---|---|
| *H01R 9/24* | (2006.01) |
| *H02J 7/56* | (2026.01) |
| *H02J 7/70* | (2026.01) |
| *H05B 45/10* | (2020.01) |
| *H05B 47/19* | (2020.01) |

(52) U.S. Cl.
CPC ......... *H01R 9/2491* (2013.01); *H01R 9/2441* (2013.01); *H02J 7/56* (2026.01); *H02J 7/70* (2026.01); *H05B 45/10* (2020.01); *H05B 47/19* (2020.01)

(58) Field of Classification Search
CPC ............... H01R 25/003; H01R 25/161; H01R 13/7175; H01R 9/2491; H01R 9/2441; H05B 47/19; H05B 45/10; H02J 7/70; H02J 7/56
USPC ........................................................ 439/651
See application file for complete search history.

(56) References Cited

U.S. PATENT DOCUMENTS

| | | | |
|---|---|---|---|
| 5,595,494 A | 1/1997 | Wiebe | |
| 7,789,686 B2 | 9/2010 | Kim | |
| 9,117,349 B2 * | 8/2015 | Shapiro | ............... G08B 29/181 |

(Continued)

OTHER PUBLICATIONS

USPTO, Non-Final Office Action dated Jun. 6, 2023 in U.S. Appl. No. 17/341,664.

(Continued)

*Primary Examiner* — Gary F Paumen
(74) *Attorney, Agent, or Firm* — SNELL & WILMER L.L.P.

(57)      ABSTRACT

This disclosure includes a system and method for integrating a power system having one or more electrical receptacles, a charging system having one or more USB charging ports, and a lighting system into one component for ease of installation and use in any environment including, for example, under cabinets, above and below countertops, at workstations, desks, overhangs, or other areas. The wiring may be split at the entrance into the chassis. Continuous power may be maintained at the receptacle locations while also powering the LED lighting via a control device such as, for example, a slide dimmer, an in-line dimmer, a wall-mounted dimmer control device, a remote control, or a WiFi connectivity device. The use of an in-line GFCI device may also be incorporated into the complete system.

16 Claims, 3 Drawing Sheets

(56)             References Cited

U.S. PATENT DOCUMENTS

| | | | | |
|---|---|---|---|---|
| 10,574,069 | B2 * | 2/2020 | Chien | F21S 8/035 |
| 10,948,136 | B2 * | 3/2021 | May | F21V 3/00 |
| 10,998,735 | B2 * | 5/2021 | Chien | F21S 6/003 |
| 10,998,736 | B2 * | 5/2021 | Chien | F21S 6/003 |
| 11,862,911 | B2 * | 1/2024 | Mortimer | H01R 25/16 |
| 2016/0064983 | A1 * | 3/2016 | Xie | H02J 7/50 |
| | | | | 320/107 |
| 2016/0186973 | A1 * | 6/2016 | Chien | F21S 8/035 |
| | | | | 362/253 |
| 2017/0054315 | A1 * | 2/2017 | Chien | F21S 8/035 |
| 2018/0166922 | A1 * | 6/2018 | Chung | H02J 50/12 |

OTHER PUBLICATIONS

USPTO, Non-Final Office Action dated Sep. 8, 2023 in U.S. Appl. No. 17/341,664.
USPTO, Notice of Allowance dated Nov. 1, 2023 in U.S. Appl. No. 17/341,664.

* cited by examiner

PLAN VIEW – CUT THROUGH VIEW

INTEGRATED ELECTRICAL, LIGHTING, AND CHARGING SYSTEMS

CROSS-REFERENCE TO RELATED APPLICATIONS

This application is a continuation-in-part of, claims priority to and the benefits of, U.S. Ser. No. 17/341,664 filed on Jun. 8, 2021 and titled "Integrated Electrical, Lighting, And Charging Systems." The '664 application claims priority to U.S. Provisional Patent Application Ser. No. 63/036,305 filed on Jun. 8, 2020 and titled "Integrated Electrical, Lighting, And Charging Systems", all of which are hereby incorporated by reference in their entireties for all purposes.

FIELD

This disclosure generally relates to power and lighting systems.

BACKGROUND

There has been a definite design push within the past several years for electrical, lighting, and charging systems to integrate seamlessly into our lives without being obtrusive in their design and ability to use. The cabinetry and casework industries have certainly seen changes in these features, but manufacturers have not designed, developed, and produced electrical, lighting, and charging systems as a single integrated unit that blend seamlessly into the current cabinet and casework designs. Moreover, the integration of these systems will help to remove some or all electrical devices from the backsplash area between the countertops and bottom of the upper wall cabinets so the design features associated with the backsplash may remain unencumbered.

SUMMARY

This disclosure includes a system and method for integrating electrical receptacles, USB changing ports, and LED lighting systems into one component for ease of installation under cabinets, countertops, at work stations, desks, overhangs, or other areas. The wiring may or may not be split at the entrance into the chassis allowing continuous power to be maintained at the receptacle and USB charging port locations, while also powering the LED lighting via a control device such as, for example, an in-line dimmer, a wall-mounted dimmer control device, a remote control, or a WiFi connectivity device. The use of an in-line GFCI device may also be incorporated into the complete system.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

Figure 1:
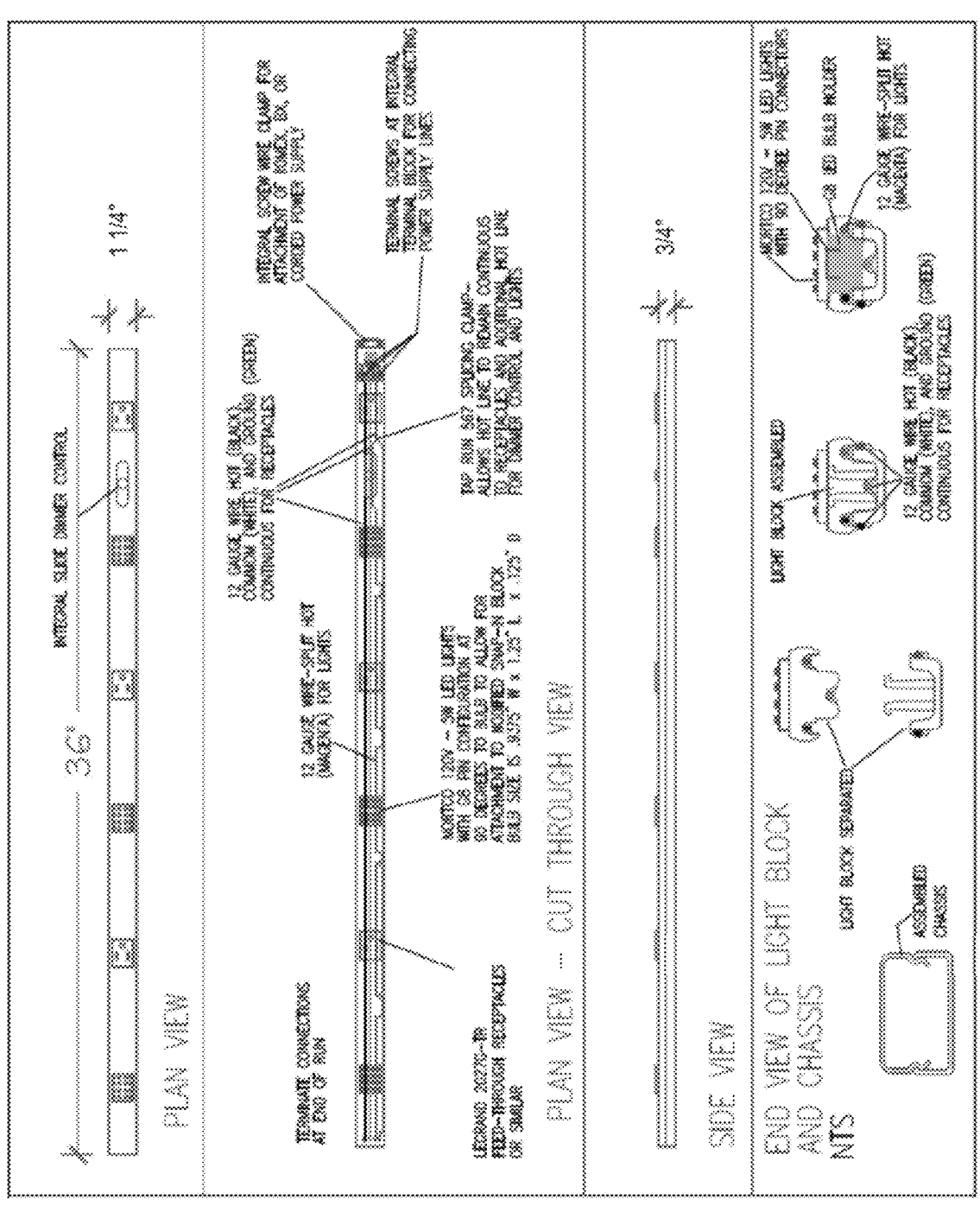
FIG. 1 is an exemplary drawing of the system, various components and exemplary wiring configurations, in according with various embodiments.

In various embodiments, as set forth in FIG. 1, the system includes a combination of receptacles, USB charging ports, and lighting. The systems may be designed for the cabinetry and casework industry for industrial, commercial, and residential environments including, but not limited to, beneath cabinetry, above or beneath countertops, at work stations, desks, and overhangs. The receptacle, lighting, and charging technologies may be in full view or may be housed, out-of-sight, underneath and within the cabinetry and casework systems. An exemplary reason for the use of this system is to house within one cohesive unit the three devices most used or required in today's work and play environments. In particular, electricity in the form of electrical receptacles, USB ports for charging electronic devices, and lighting to allow the user to see what they're doing. Another reason for using the system is to remove all electrical devices from the backsplash area between the countertops and bottom of the upper wall cabinets so the design features associated with the backsplash may remain unencumbered. The system is designed to be user and installer friendly with all systems having the ability to be installed with or without the use of licensed electricians depending on the systems selected for use.

The system allows for electrical, lighting, and charging systems to be combined into one discreet system that hides conveniently behind molding. For example, the system may hide behind a ¾" (20 mm) high light molding, or in the case of frameless cabinetry, within a 1⁵⁄₁₆" (33 mm) wide or 2¹⁄₁₆" (53 mm) wide by ¾" D (20 mm) channel depending on the lighting system selected. The systems may be available in corded or hardwired applications. The systems may be extended in intervals of 12" (30.48 cm) up to a total length of 20' (609.6 cm). The lighting for the systems may be low-voltage or line voltage LED lighting. The lighting may be capable of being dimmer controlled at the unit, remotely via hard-wire, remotely via remote control, or via WiFi connectivity.

The system may be used by three levels of clientele: The do-it-yourselfer (DIY), the construction professional, and the licensed electrical professional.

In various embodiments, systems are designed for the DIYer and include electrical, lighting, and charging ports that are positioned as required to meet most NEC conditions. The system is a single-circuit system with integrated electrical receptacles and LED lighting. For example, the receptacles may be located on 6" or 12" centers and one set of USB charging ports for 12", 24", and 36" lengths with the LED lighting system continuous to whatever length the receptacle and USB charging port strips are produced. Lighting may turned on and off via a slide dimmer switch (e.g., located at one end of the of the chassis body), a remote control dimmer, and/or a WiFi enabled control device (e.g., a mobile phone or voice-activated device like Alexa). The system may be available in corded varieties and in 12", 24", 36", 48", 60", and 72" lengths. In various embodiments, the systems are designed to be energized via a GFCI receptacle installed in the cabinet above or adjacent to where the system is located that is recessed into the wall at 6" to 16" above the bottom of the cabinet. The user simply plugs the system into the GFCI receptacle. The wiring within the system features feed-thru 12 gauge copper wiring rated for 20 amps that is split at the entrance into the chassis. A chassis may include any compartment, enclosure, multiple compartments joined together or the like, in any shape, configuration, size or material. In various embodiments, continuous power is maintained at the receptacle locations, while also powering the line voltage LED lighting via a dimmer as noted above. The chassis material may be steel, aluminum, or other material with finishes in, but not limited to, brushed steel, stainless steel, white, almond, brown, and black.

In various embodiments, the systems may be designed for use by construction professionals. The system may include electrical receptacles, lighting, and charging ports. The system may be a one-circuit or two-circuit system. If a two-circuit system, then one circuit is energized for receptacles and charging ports and the other circuit is used to control the lighting systems. The two-circuit system allows for lighting to be controlled via wall mounted dimmer switches or one of the other control options noted above and multiple systems to be controlled from one switching location or device.

Figure 2:
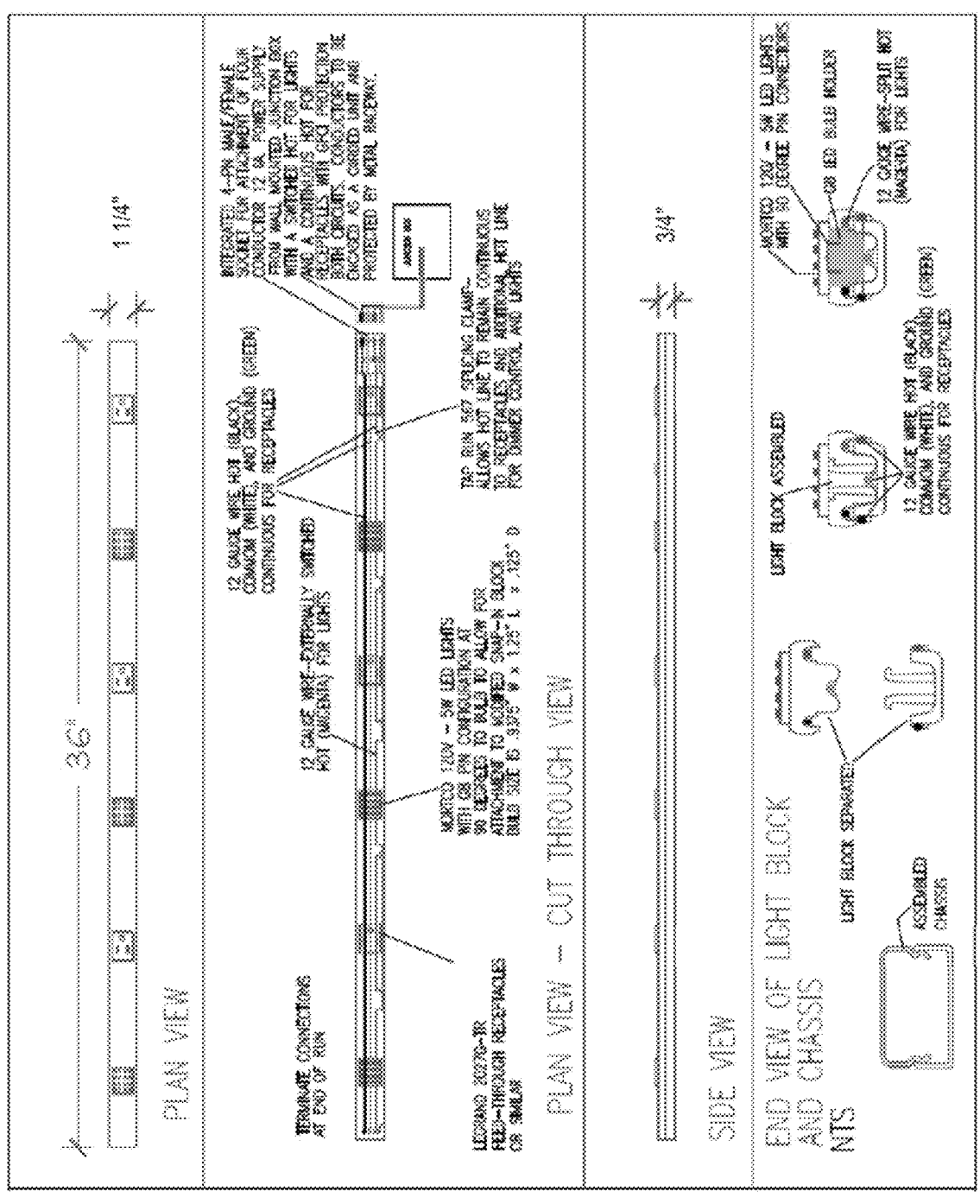
FIG. 2 is an exemplary 4-pin connection to the chassis having four conductors including a common (white) ground (green), continuous hot for the receptacles (shown in red but could be a black wire), and an externally switched hot for the LED lights (shown in magenta but could be a red wire), in according with various embodiments.
Figure 3:
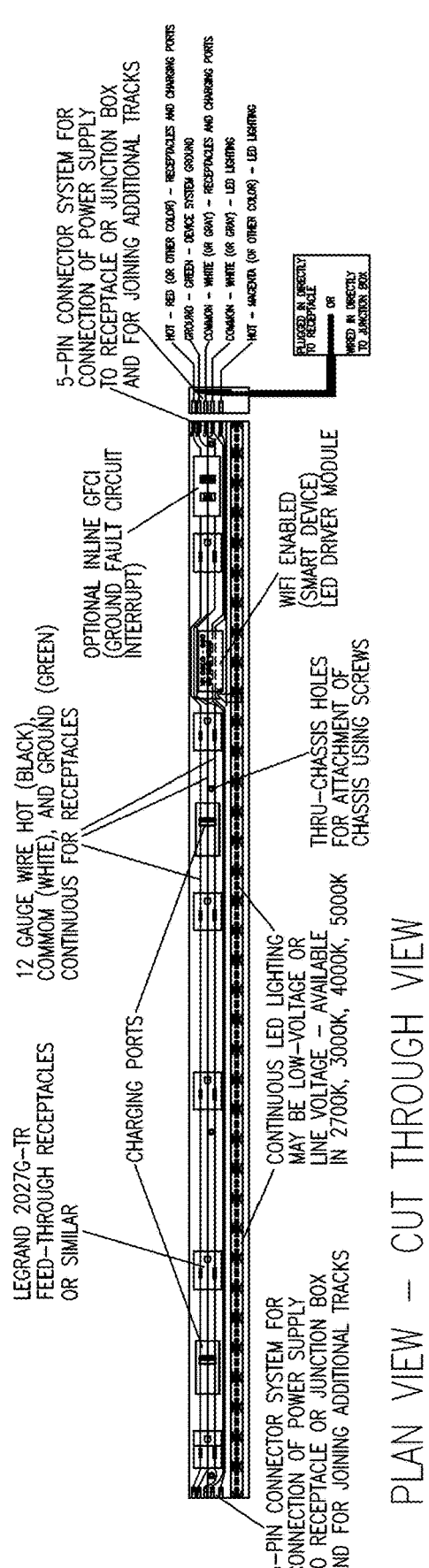
FIG. 3 is an exemplary 5-pin connection to the chassis having five conductors including a common (white) for the receptacles and USB charging ports, a common (gray) for the LED lighting, ground (green), continuous hot for the receptacles (shown in red but could be a black wire or other color), and a hot for the LED lights (shown in magenta but could be a red wire or other color), in according with various embodiments.

In various embodiments, as set forth in FIG. 2, the system may include a 5-pin connection to a two-circuit system. When hardwired, the system may include two separate feeds. In various embodiments, a first feed may be continuously hot for the receptacles and USB charging ports and a second feed may be used for controlling the lights. Both the first and second feeds may be attached to the system via a 5-pin connecting wire with male/female 12 gauge conductors. The conductors may be wired into the system at a wall-mounted junction box. The conductors may be plugged into the chassis via the 5-pin connector with the chassis containing the male side of the connection and the 5-pin connecting wire containing the female side of the connection. A spring-loaded clamp may keep the connection secure at the chassis. The 5-pin connecting wire may be encased as a corded unit. The 5-pin connecting wire may be protected by a metal raceway (e.g., ¾" wide by ½" high) from where it leaves the junction box to the connection at the chassis. A similar pin connecting device system may be used for other models, but it may only include a 3-pin or 4-pin conductor.

In the event the 5-pin connector is not used, the receptacle and USB port portions of the systems are designed to be energized via a GFCI receptacle installed in the cabinet above or adjacent to where the system is located that is recessed into the wall at 1" to 3" above the bottom of the cabinet. If hardwired, two exemplary options exist for powering the system. First, the feed from the load side of the GFCI is attached to the system via a self-clamping romex/ MX connector and terminals for the hot, common, and ground wires. Second, the 24" whip included with the system is connected to the load side of the GFCI receptacle with all wiring connections occurring in the electrical box that houses the GFCI receptacle. If corded, the cord is simply plugged into the GFCI receptacle. In various embodiments, the systems are designed for the licensed electrical professional and are designed to be integrated into the design of the environment from the beginning stages of the project. In various embodiments, the systems include electrical receptacles, lighting, and charging ports, and it is also a two-circuit system with one circuit for receptacles and charging ports and the other for lighting. The systems are designed to be energized via two separate circuits with one circuit energized continuously while the other is a switched for the lighting control. Chassis material is available in natural milled aluminum or steel with finishes in brushed steel/stainless steel, white, almond, brown, and black.

In various embodiments, connectivity from one system to another, or one unit to another, may be by joining the conductors together via wire nuts housed within the chassis and sliding one chassis into the next. In various embodiments, connectivity from one system to another, or one unit to another, may be via a male/female port system whereby one system simply plugs into the next via the 5-pin connecting system. In various embodiments, connectivity from one system to another, or one unit to another, may be via a 5-pin coupling whereby one system plugs into one side of the 5-pin coupling and the other system plugs into the other side of the 5-pin coupling.

12 gauge conductors within the system may be in the form of copper, or other conductor material, that are extruded or otherwise manufactured to be flat and/or rectangular/square in their shape and housed/insulated within the chassis system to aid in the transfer of electricity through the chassis system from one block type to the next block type and the connection of one chassis system to the next chassis system. Reshaping the conductors may allow for better positioning of the conductor within the chassis for high/low positioning in multi-circuit applications and better connection of the snap-in blocks to the conductor.

Blocks for receptacle and charging ports may have their conductors at specific height positions on both sides of the block which are different from the height positions for the lighting blocks. The differing height positions of the conductors on the blocks defines that a receptacle or charging port will only make contact with the conductors specific to its use in the chassis system while the lighting blocks only make contact with the conductors specific to its use in the chassis system. The differing of connections between the receptacle/charging port block types and the lighting block types is crucial in a multi-circuit system that allows for continuous connectivity to the receptacles and charging ports while also allowing the lighting to be controlled separately and remotely via a wall switch or remote control device.

The attachment of the systems to the cabinetry may be via the Strap-N-Snap attachment system for the systems whereby a spring-loaded U-shaped strap is first attached to the bottom of the cabinetry using ⅜" wood screws at multiple positions depending on the length of the chassis system. Once the straps have been secured to the bottom of the cabinetry the chassis is then snapped into the straps and held firmly in place. Strap-N-Snap allows for the installation of a corded system without the user/installer ever having to open the chassis system.

Some of the differences between the present systems and prior systems with receptacle strips have to do with the joining of a lighting block system platform that works in conjunction with a receptacle block system platform, the internal wiring within the chassis system, the connection of the line voltage electrical wires to the system, the use of line voltage LED lighting, and the chassis system itself.

Exemplary purposes of the systems are to integrate electrical receptacles, USB charging ports, and LED lighting systems into one component for ease of installation and use in any environment including, but not limited to, under cabinets, above and below countertops, at work stations, desks, overhangs, or other areas. The system also includes an all-in-one lighting and receptacle format that meets the needs of design professionals and their clients at nearly any price point. The system also includes a system of lighting and receptacle products that are installer friendly, even to the point that a DIYer can install them.

For the industry professional, the system includes a system of combined lighting and receptacle based systems that can be seamlessly integrated into design process and meet the finish needs of the most discriminating clientele.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A system comprising:
a power system having one or more receptacles;
a lighting system having one or more LED lighting components;
a charging system having one or more charging ports;
the power system, the lighting system and the charging system integrated into a chassis;
wiring that is split into first wiring and second wiring;
the first wiring interfaces with the power system and the charging system; and
the second wiring interfaces with the lighting system.

2. The system of claim 1, wherein the wiring that is split into the first wiring and the second wiring is at an entrance into the chassis.

3. The system of claim 1, wherein continuous power is maintained in the first wiring for the power system and the charging system.

4. The system of claim 1, wherein the lighting system is controlled by a control device.

5. The system of claim 1, wherein the lighting system is controlled by a control device, and wherein the control device includes at least one of a slide dimmer or a wall switch.

6. The system of claim 1, wherein the lighting system is electrically controlled independently of the power system.

7. The system of claim 1, wherein the lighting system is configured to light a workspace area.

8. The system of claim 1, wherein the charging system includes at least one of a USB charging port or a lightening charging port.

9. The system of claim 1, wherein the power system includes the charging system.

10. The system of claim 1, further comprising a GFCI receptacle integrated into the chassis.

11. The system of claim 1, further comprising a 5-pin connector system at one or more ends of the chassis, wherein the 5-pin connector system interfaces the power supply with the power system.

12. The system of claim 1, further comprising a 5-pin connector system at one or more ends of the chassis, wherein the 5-pin connector system is configured to interface with an additional chassis.

13. The system of claim 1, further comprising a 5-pin connector system at one or more ends of the chassis, wherein the 5-pin connector system is configured to interface with a junction box.

14. The system of claim 1, further comprising a wifi enabled driver module for the lighting system.

15. The system of claim 1, wherein the lighting system is at least one of low voltage or line voltage.

16. The system of claim 1, further comprising a diffuser over at least a portion of the lighting system.

* * * * *